(12) United States Patent
Kim

(10) Patent No.: US 8,948,242 B2
(45) Date of Patent: Feb. 3, 2015

(54) ENCODING DEVICE AND METHOD AND MULTIMEDIA APPARATUS INCLUDING THE ENCODING DEVICE

(75) Inventor: Seong Hee Kim, Seoul (KR)

(73) Assignee: Core Logic Inc., Seoul (KR)

( * ) Notice: Subject to any disclaimer, the term of this patent is extended or adjusted under 35 U.S.C. 154(b) by 399 days.

(21) Appl. No.: 13/256,846

(22) PCT Filed: Mar. 17, 2010

(86) PCT No.: PCT/KR2010/001634
§ 371 (c)(1),
(2), (4) Date: Sep. 15, 2011

(87) PCT Pub. No.: WO2010/107237
PCT Pub. Date: Sep. 23, 2010

(65) Prior Publication Data
US 2012/0002724 A1    Jan. 5, 2012

(30) Foreign Application Priority Data

Mar. 19, 2009    (KR) ........................ 10-2009-0023547

(51) Int. Cl.
| | | |
|---|---|---|
| *H04N 7/12* | (2006.01) | |
| *H04N 11/02* | (2006.01) | |
| *H04N 11/04* | (2006.01) | |
| *H04N 19/124* | (2014.01) | |
| *H04N 19/152* | (2014.01) | |
| *H04N 19/176* | (2014.01) | |
| *H04N 19/115* | (2014.01) | |
| *H04N 19/177* | (2014.01) | |

(52) U.S. Cl.
CPC ..... *H04N 19/0009* (2013.01); *H04N 19/00193* (2013.01); *H04N 19/00278* (2013.01); *H04N 19/0006* (2013.01); *H04N 19/00284* (2013.01)
USPC ........................................................ 375/240

(58) Field of Classification Search
None
See application file for complete search history.

(56) References Cited

U.S. PATENT DOCUMENTS 5,890,102 A * 3/1999 Kossentini et al. ........... 702/181
6,134,374 A * 10/2000 Harumatsu et al. ........... 386/328
(Continued)

FOREIGN PATENT DOCUMENTS

CN    101325698 A    12/2008
JP    04369191 A    12/1992
(Continued)

*Primary Examiner* — Dave Czekaj
*Assistant Examiner* — Mohammad J Rahman
(74) *Attorney, Agent, or Firm* — Lowe Hauptman & Ham, LLP

(57) ABSTRACT

An encoding device and method of using a bit rate control method which accurately predicts a target bit amount, provides excellent quality, and is applicable to a real-time environment through a simple mechanism, and a multimedia apparatus including the encoding device. The encoding device includes a group-of-pictures (GOP)-based bit assigning unit for assigning a GOP-based bit amount target$_{GOP}$, a macroblock-based bit assigning unit for assigning a macroblock-based bit amount for all macroblocks included in the GOP, a quantizing device for checking a current buffer state, determining a quantization parameter (QP) by using an alternating current (AC) coefficient obtained by transforming a macroblock if a buffer occupancy rate is lower than a predetermined limit rate, and performing quantization by using the determined QP, and a variable length coding (VLC) unit for performing VLC.

17 Claims, 4 Drawing Sheets

(56) References Cited

U.S. PATENT DOCUMENTS

| | | | |
|---|---|---|---|
| 2005/0175090 A1* | 8/2005 | Vetro et al. | 375/240.03 |
| 2006/0008006 A1* | 1/2006 | Cha et al. | 375/240.16 |
| 2008/0298702 A1* | 12/2008 | Gunupudi et al. | 382/251 |
| 2008/0304564 A1 | 12/2008 | Kim et al. | |
| 2009/0067493 A1 | 3/2009 | Jun et al. | |
| 2009/0252233 A1* | 10/2009 | Ji et al. | 375/240.25 |
| 2010/0061461 A1* | 3/2010 | Bankoski et al. | 375/240.16 |

FOREIGN PATENT DOCUMENTS

| | | |
|---|---|---|
| JP | 2003174648 A | 6/2003 |
| JP | 2007116655 A | 5/2007 |
| KR | 10-2006-0083297 A | 7/2006 |
| KR | 10-2007-0053642 A | 5/2007 |
| KR | 10-2007-0061105 A | 6/2007 |
| KR | 10-2008-0107867 A | 12/2008 |
| KR | 10-2008-0108775 A | 12/2008 |

* cited by examiner

ENCODING DEVICE AND METHOD AND MULTIMEDIA APPARATUS INCLUDING THE ENCODING DEVICE

This is a National Phase Application filed under 35 U.S.C. 371 as a national stage of PCT/KR2010/001634, filed Mar. 17, 2010, and claiming the benefit from Korean Application No. 10-2009-0023547, filed Mar. 19, 2009, the content of which is hereby incorporated by reference in its entirety.

TECHNICAL FIELD

The present invention relates to a digital multimedia apparatus, and more particularly, to an encoding device and method capable of efficiently performing video encoding in a multimedia apparatus.

BACKGROUND ART

Video encoders refer to devices which convert video signals conveying a huge amount of data into compressed formats, i.e., bitstreams before storage or transmission of the video signals. The video encoders use quantization for video signal compression; the quantization technique converts a value in a particular range by using a quantization parameter in such a way that the value has a smaller range than its original range.

For example, when a large quantization parameter is used in quantization, a range of quantized values is small and thus compression performance is high, but leading to large differences between the quantized values and original signal values and thus resulting in quality degradation. On the other hand, for a small quantization parameter, the quantized values become closer to the original signal values, but compression performance is not good because of a large range of the quantized values.

For output bitstreams of video encoders, a constant bit rate (CBR) or a variable bit rate (VBR) may be used according to purpose of use. The CBR involves encoding into a predetermined number of bits during a predetermined time. The CBR is used when a limited bandwidth or storage medium is used. With the CBR, however, good quality is not guaranteed for an image having a large motion or a complicated image. On the other hand, the VBR involves encoding into a predetermined quality regardless of the characteristics of an image. The VBR is used when a sufficient bandwidth is used or such a storage medium as a digital video disk (DVD) is used.

In the CBR scheme, a bit rate control method is used for encoding into a predetermined number of bits, and a bit rate, i.e., a bit amount, is controlled by properly using a quantization parameter and a frame skip. The frame skip means skipping encoding with respect to a particular frame, when necessary.

To reduce a bit amount, a large quantization parameter and a frame skip may be used; to increase a bit amount, a small quantization parameter may be used. Since the quantization parameter has a great influence upon quality as well as a bit amount, it is important to use a proper quantization parameter. A bit rate control method for determining a quantization parameter has not yet been standardized. As a result, a bit rate control method may vary from encoder to encoder and the performance of an encoder is much affected by a bit rate control method.

A conventional bit rate control method may be roughly classified into two methods: one is determining a quantization parameter in proportional to a fullness of a buffer, that is, an occupancy rate of the buffer, and the other is calculating a complexity of an input image and assigning bits in proportional to the calculated complexity.

The former involves controlling a quantization parameter based on a current buffer state, by taking account of a remaining buffer capacity and a bandwidth of a transmission medium. This bit rate control method is generally used in test model 5 (TM5), which pertains to the moving picture experts group (MPEG), and video codec test model, near-term, version 8 (TMN8), which pertains to the video coding experts group (VCEG). The latter involves assigning bits to each unit of encoding and controlling a quantization value depending on a complexity of an image.

The former method, which controls a quantization parameter based on a current buffer state, can be simply implemented, but does not consider an image. As a result, a target bit amount may be suitable for a certain image, but not for another. Moreover, the large quality change of an image may be offensive to the eyes.

On the other hand, the latter method which assigns bits considering a complexity of an input image provides good quality while maintaining a desired bit rate, but requires complex pixel-based computations, such as calculation of an average and a variance, to analyze the complexity of the image, thereby lowering encoding speed and increasing memory consumption. Although many algorithms related to complexity analysis have already been developed, they are not viable for real-time applications due to complex computations and are hardly used in practice.

DISCLOSURE OF INVENTION

Technical Problem

The present invention provides an encoding device and method of using a bit rate control method which accurately predicts a target bit amount, provides excellent quality, and is applicable to a real-time environment based on its simple mechanism, and a multimedia apparatus including the encoding device.

Solution to Problem

According to an aspect of the present invention, there is provided an encoding device including a group-of-pictures (GOP)-based bit assigning unit assigning a GOP-based bit amount $target_{GOP}$, a macroblock-based bit assigning unit assigning a macroblock-based bit amount for all macroblocks included in the GOP, a quantizing device checking a current buffer state, determining a quantization parameter (QP) by using an alternating current (AC) coefficient obtained by transforming a macroblock if a buffer occupancy rate is lower than a predetermined limit rate, and performing quantization by using the determined QP, and a variable length coding (VLC) unit performing VLC.

In the present invention, the GOP-based bit assigning unit may divide a target bit rate per second $target_{sec}$ by a frame per second fps and multiply a result of the division by a key frame interval $I_{interval}$, thereby calculating the GOP-based bit amount $target_{GOP}$. The macroblock-based bit assigning unit may assign a bit amount in units of a macroblock each time encoding on the GOP starts, and the macroblock-based bit assigning unit may assign a bit amount to each intra macroblock and each inter macroblock, which are two modes of the macroblock. For example, a bit amount $target_{inter\_MB}$ of the inter macroblock may be calculated by dividing the GOP-based bit amount $target_{GOP}$ by a sum of the key frame interval $I_{interval}$ and the bit amount ratio $Ratio_{Itop}$ and dividing a result of the division by the number of macroblocks MB_Num present in a single frame.

In the present invention, the quantizing device may include a predicting and transforming unit for performing intra prediction, inter prediction, and transformation on the macroblock, a QP determining unit for analyzing the AC coefficient obtained by the transformation and for determining the QP, a QP adjusting unit for comparing a current QP with a neighbor QP and adjusting the current QP such that a difference between the current QP and the neighbor QP is within a predetermined threshold, and a quantizing unit for performing quantizing by using the QP.

According to another aspect of the present invention, there is provided a multimedia apparatus including an input unit to which a signal to be encoded is input, an encoding device for performing encoding by quantizing the signal being input to the input unit according to group-of-pictures (GOP)-based bit assignment, macroblock-based bit assignment, and a buffer state, a transmitting unit for transmitting a bitstream encoded by the encoding device, a storing unit for storing the bitstream encoded by the encoding device, and a control unit for controlling the input unit, the encoding device, the transmitting unit, and the storing unit.

According to another aspect of the present invention, there is provided an encoding method including a group-of-pictures (GOP)-based bit assigning operation of assigning a GOP-based bit amount $target_{GOP}$, a macroblock-based bit assigning operation of assigning a macroblock-based bit amount for all macroblocks included in the GOP according to a mode, a quantizing operation of checking a current buffer state, determining a quantization parameter (QP) by using an alternating current (AC) coefficient obtained by transforming a macroblock if a buffer occupancy rate is lower than a predetermined limit rate, and performing quantization by using the determined QP, and a variable length coding (VLC) operation of performing VLC.

In the present invention, the encoding method may further include a buffer checking operation of checking a buffer state prior to the quantizing operation. Subsequently, if the buffer occupancy rate is higher than a predetermined limit rate, the VLC operation is performed skipping the quantization operation.

Advantageous Effects of Invention

The encoding device and method and the multimedia apparatus including the encoding device according to the present invention calculate a GOP-based bit amount $target_{GOP}$ in a simple way, that is, by using a target bit rate per second $target_{sec}$, a frame per second fps, and a key frame interval $I_{interval}$, and calculate a macroblock-based bit amount by using a bit amount ratio $Ratio_{Itop}$ of an intra macroblock to an inter macroblock, thereby providing superior bit amount prediction and excellent quality.

Furthermore, the encoding device and method and the multimedia apparatus according to the present invention predict a bit amount as described above and skip coding in units of a macroblock, when necessary, by checking a buffer state, thereby preventing overflow and thus enabling stable encoding. Consequently, the encoding device and method and the multimedia apparatus according to the present invention can be effectively and stably used in a video encoder which uses a limited bandwidth or a storage medium as an application.

BRIEF DESCRIPTION OF DRAWINGS

The above and other features and advantages of the present invention will become more apparent by describing in detail exemplary embodiments thereof with reference to the attached drawings in which.

BEST MODE FOR CARRYING OUT THE INVENTION

Figure 1:
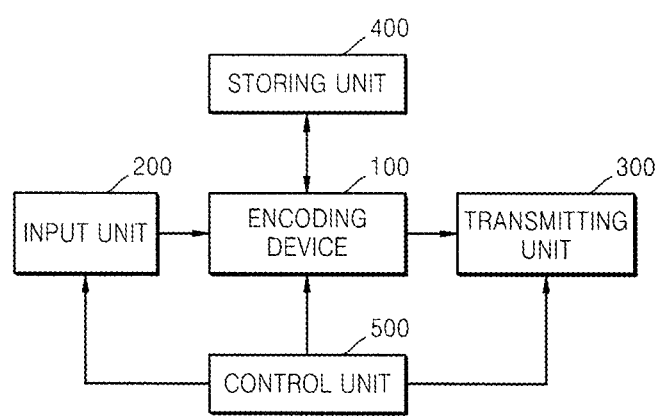
FIG. 1 is a block diagram of a multimedia apparatus according to an embodiment of the present invention.

Hereinafter, exemplary embodiments of the present invention will be described in detail with reference to the accompanying drawings. In the following description, when it is described that an element is connected to another element, it may be connected directly to another element, but a third element may also be interposed therebetween. Additionally, in the drawings, the structure or size of each element is exaggerated for convenience and clarity of illustration and portions unrelated to description are omitted. Like reference numerals indicate like elements throughout the drawings. Terms used therein are used only for illustrative purposes and are not intended to limit the scope of the present invention defined in the claims.

FIG. 1 is a block diagram of a multimedia apparatus according to an embodiment of the present invention.

Referring to FIG. 1, the multimedia apparatus according to an embodiment of the present invention includes an input unit 200, an encoding device 100, a transmitting unit 300, a storing unit 400, and a control unit 500.

A signal to be encoded is input to the input unit 200 by the encoding device 100. The transmitting unit 300 transmits a bitstream, which is output after being encoded by the encoding device 100.

After controlling a bit amount through group-of-pictures (GOP)-based bit assignment and macroblock-based bit assignment with respect to the signal input to the input unit 200, the encoding device 100 performs quantization based on a buffer state and performs variable length coding (VLD), thereby performing frame-based encoding. The encoding device 100 controls the bit amount by using a target bit rate per second $target_{sec}$, a frame per second fps, a key frame interval $I_{interval}$, and a bit amount ratio $Ratio_{Itop}$ of an intra macroblock to an inter macroblock.

In this way, the encoding device 100 can accurately predict a bit amount without suffering from complex computations for analyzing complexity. Moreover, the buffer state is checked before quantization, and the quantization is performed based on a buffer occupancy rate, thereby preventing overflow from occurring due to excessive buffer occupancy and thus enabling smooth encoding. The encoding device 100 will be described later in more detail with reference to FIG. 2.

The storing unit 400 stores the bitstream which is output after being encoded by the encoding device 100 or stores data required during encoding. The control unit 500 controls overall operations of the input unit 200, the encoding device 100, the transmitting unit 300, and the storing unit 400. Although the encoding device 100 is included in the multimedia apparatus as shown in FIG. 1, a decoding device (not shown) may also be included in the multimedia apparatus. The multimedia apparatus may also include an output unit (not shown) corresponding to the input unit and a receiving unit (not shown) corresponding to the transmitting unit.

The multimedia apparatus according to the current embodiment may accurately predict and control a bit amount, and enable smooth encoding by preventing overflow due to the encoding device 100 which may assign a bit amount in units of a GOP (a GOP-based bit amount) and a bit amount in units of a macroblock (a macroblock-based bit amount) by using several parameters, that is, $target_{sec}$, fps, $I_{interval}$, and $Ratio_{Itop}$, and check a buffer state and performs quantization.

Figure 2:
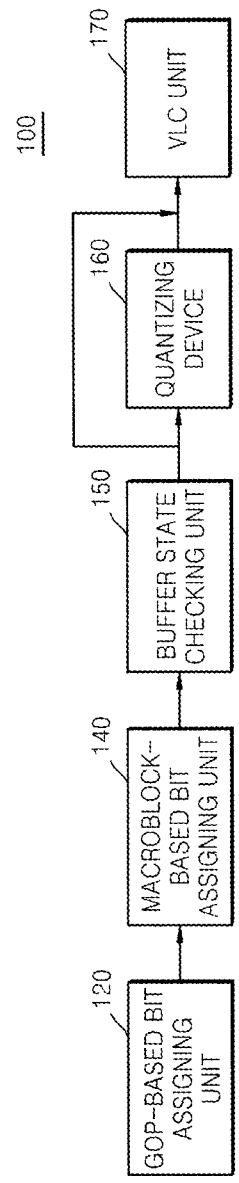
FIG. 2 is a detailed block diagram of an encoding device included in the multimedia apparatus shown in FIG. 1, according to an embodiment of the present invention.

FIG. 2 is a detailed block diagram of the encoding device 100 included in the multimedia apparatus shown in FIG. 1, according to an embodiment of the present invention.

Referring to FIG. 2, the encoding device 100 according to the current embodiment includes a GOP-based bit assigning unit 120, a macroblock-based bit assigning unit 140, a buffer state checking unit 150, a quantizing device 160, and a variable length coding (VLC) unit 170.

The GOP-based bit assigning unit 120 assigns a bit amount in units of a GOP, and uses several parameters such as $target_{sec}$, fps, $I_{interval}$, and $Ratio_{Itop}$ for GOP-based bit assignment. Letting a GOP-based bit amount be $target_{GOP}$, then $target_{GOP}$ may be expressed as follows:

$$target_{GOP} = (target_{sec}/fps) \times I_{interval} \quad \text{(Equation 1)},$$

where parameters $target_{sec}$, fps, and $I_{interval}$ are set by a user according to an image. $target_{sec}/fps$ refers to a bit amount per frame and a product of $target_{sec}/fps$ and $I_{interval}$ is a bit amount of all frames within a GOP. Eventually, $target_{GOP}$ represents a bit amount assigned to a single GOP including a key frame.

The macroblock-based bit assigning unit 140 assigns a bit amount in units of a macroblock after GOP-based bit assignment is performed by the GOP-based bit assigning unit 120. The macroblock-based bit assigning unit 140 assigns a bit amount to each intra macroblock and each inter macroblock in every start of a GOP. The bit amount is calculated as below.

$$target_{inter\_MB} = target_{GOP}/(I_{interval} + Ratio_{Itop}) \times 1/MB\_Num \quad \text{(Equation 2)}$$

$$target_{intra\_MB} = target_{inter\_MB} \times Ratio_{Itop} \quad \text{(Equation 3)}$$

$target_{inter\_MB}$ represents a bit amount assigned to an inter macroblock, and $target_{intra\_MB}$ represents a bit amount assigned to an intra macroblock. $Ratio_{Itop}$ represents a bit amount ratio of the intra macroblock to the inter macroblock, and MB_Num represents the number of macroblocks included in a frame.

Reviewing Equation 2, $target_{GOP}/(I_{interval}+Ratio_{Itop})$ is a bit amount per frame determined based on $Ratio_{Itop}$, and the bit amount per frame is divided by the total number of macroblocks included in a frame, resulting in a bit amount per macroblock. In particular, Equation 2 is an equation for calculating a bit amount per inter macroblock. Equation 3 is an equation for calculating a bit amount per intra macroblock. The calculation of a bit amount per intra macroblock can be easily performed by multiplying the bit amount per inter macroblock, calculated by Equation 2, by $Ratio_{Itop}$.

$Ratio_{Itop}$ is first set by using an initial value determined experimentally, and then updated by using an average bit amount ratio of previous inter and intra macroblocks and current $Ratio_{Itop}$ in every start of encoding of a GOP. $Ratio_{Itop}$ has to be 1 at a strict constant bit rate, but if an identical bit amount is assigned to an intra mode, that is, an intra macroblock, and an inter mode, that is, an inter macroblock, the quality of an intra frame largely degrades and all the other inter frames in the same GOP may be affected by such quality degradation of the intra frame, thereby deteriorating the quality of all frames. Therefore, it is desirable to assign a larger bit amount to the intra mode than the inter mode. For example, $Ratio_{Itop}$ may be preferably 3~4.

For reference, a GOP may be divided into an intra frame or a key frame composed of macroblocks, all of which are intra macroblocks, and an inter frame composed of macroblocks, most of which are inter macroblocks and some of which are intra macroblcoks.

The buffer state checking unit 150 checks a buffer occupancy rate during encoding.

The quantizing device 160 performs or does not perform quantization depending on a current buffer state checked by the buffer state checking unit 150. That is, if a current buffer occupancy rate is lower than a predetermined limit rate, the quantizing device 160 performs transformation on a macroblock to obtain an alternating current (AC) coefficient, determines a quantization parameter (QP) by using the obtained AC coefficient, and then performs quantization by using the determined QP. If the current buffer occupancy rate is higher than the predetermined limit rate, the quantizing device 160 does not perform quantization. In this way, by performing or skipping quantization depending on the buffer state, overflow caused by excessive buffer occupancy can be prevented. The quantizing device 160 will be described later in more detail with reference to FIG. 3.

The VLC unit 180 performs VLC on the macroblock on which the quantization is performed or skipped, thereby completing encoding with respect to a single macroblock.

The encoding device 100 according to the current embodiment calculates a bit amount by using several parameters and checking a buffer state to perform or skip quantization depending on the buffer state, thereby accurately predicting a bit amount and thus providing superior quality, together with stable encoding. Accordingly, the encoding device 100 smartly combines a method of controlling a bit amount based on a buffer state and a method of controlling a bit amount according to a complexity of an input image, and calculates a bit amount by using several parameters, which can be easily predicted and changed, instead of analyzing the complexity for a bit amount calculation, thereby simplifying calculations and thus solving problems related to encoding speed and memory consumption.

Figure 3:
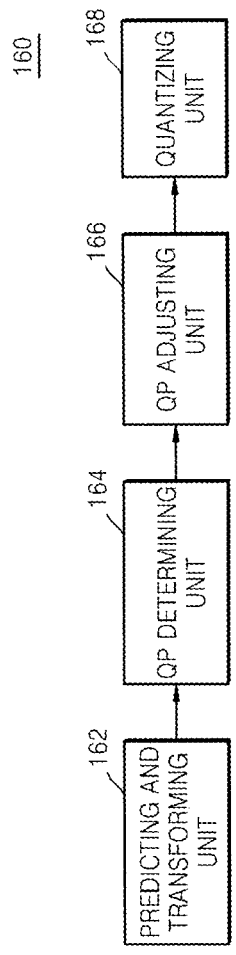
FIG. 3 is a detailed block diagram of a quantizing unit included in the encoding device shown in FIG. 2, according to an embodiment of the present invention.

FIG. 3 is a detailed block diagram of the quantizing device 160 included in the encoding device 100 shown in FIG. 2, according to an embodiment of the present invention.

Referring to FIG. 3, the quantizing device 160 according to the current embodiment includes a predicting and transforming unit 162, a QP determining unit 164, a QP adjusting unit 166, and a quantizing unit 168.

The predicting and transforming unit 162 performs intra prediction and inter prediction on a macroblock for motion compensation. Generally, inter prediction, representative examples of which are motion estimation and motion compensation, compresses an image by removing temporal redundancy between pictures. Intra prediction reduces spatial redundancy in a frame and is performed to improve the compression efficiency of an intra frame. Intra prediction/inter prediction is well known in the technical field of the present invention, and thus will not be described in detail.

The predicting and transforming unit 162 performs domain transformation prior to quantization. For example, the prediction and transforming unit 162 may perform discrete cosine transformation (DCT) or wavelet transformation as domain transformation. Such transformations are often used in joint photographic experts group (JPEG) image compression and motion joint photographic experts group (MJPEG), moving picture experts group (MPEG), and digital versatile (DV) video compressions. In the following description, DCT will be taken as an example. DCT is also widely known in the technical field of the present invention and thus will not be described in detail.

The QP determining unit 164 determines a QP by using the AC coefficient obtained through DCT. That is, by performing DCT, a direct current (DC) coefficient and the AC coefficient may be obtained, where the DC coefficient refers to a first coefficient of a low frequency located at the top leftmost of a coefficient block obtained by DCT, that is, a DC component, and the other coefficients of the coefficient block are coefficients of a high frequency, that is, AC coefficients.

The AC coefficient has, as a variance component, Laplacian distribution which is proportional to a bit amount. By using such AC coefficient distribution, a macroblock-based bit amount is predicted and a QP is determined based on the predicted macroblock-based bit amount. The AC coefficient may be obtained by other transformations, such as wavelet transformation, as well as DCT.

The QP adjusting unit 166 compares a QP determined by the QP determining unit 164 with a neighbor QP and adjusts the determined QP in such a way that a difference between the determined QP and the neighbor QP is within a predetermined threshold. Even though the QP determining unit 164 determines the QP by using the AC coefficient, a large difference in QP between macroblocks may cause a blocking phenomenon. Therefore, the QP adjusting unit 166 compares the QP of a current macroblock with a QP of a neighbor macroblock and adjust the QP determined by the QP determining unit 164 in such a way that a difference between the determined QP and the QP of the neighbor macroblock is within the predetermined threshold. Macroblock-based QP calculation may increase system complexity, and thus complexity may be properly controlled by periodically changing a QP.

The quantizing unit 168 performs quantization by using a QP finally determined by the adjustment of the QP adjusting unit 166. The quantization is widely known in this field and thus will not be described in detail.

In the current embodiment, the quantizing device 160 may continue or stop quantization on a macroblock depending on a buffer occupancy rate during encoding. Therefore, it is possible to minimize a possibility of overflow due to excessive buffer occupancy.

Figure 4:
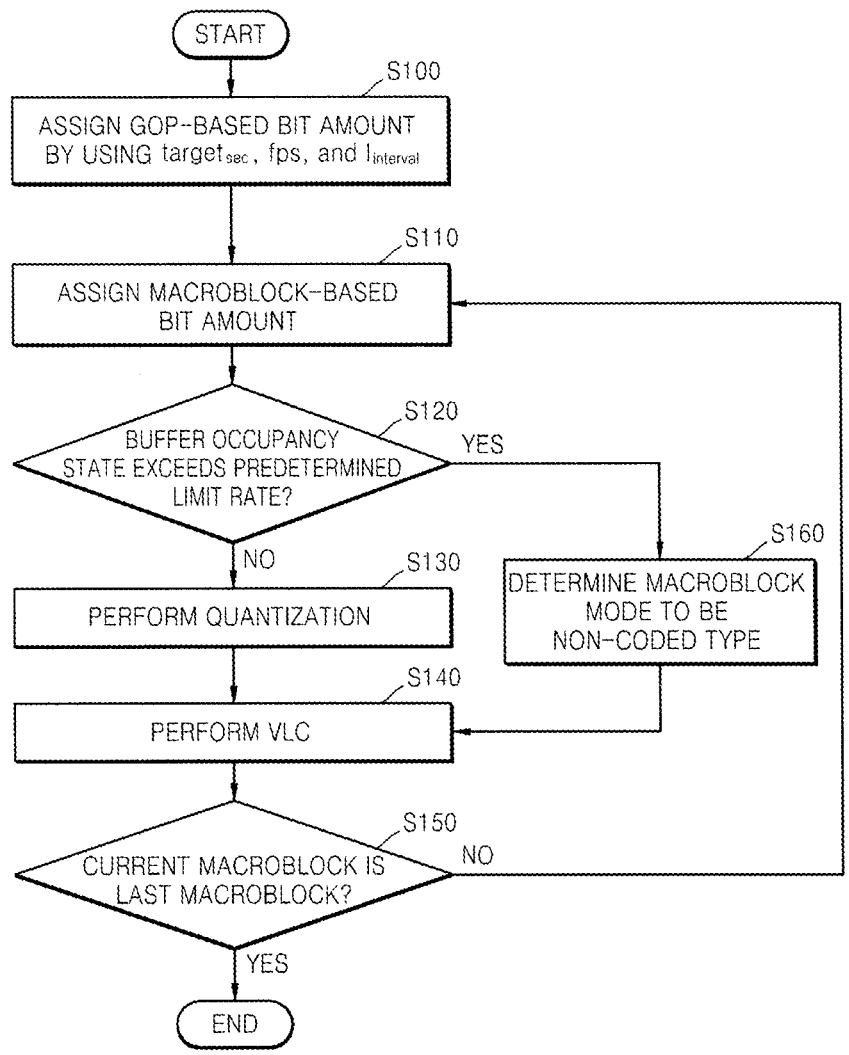
FIG. 4 is a flowchart illustrating an encoding method according to another embodiment of the present invention.

FIG. 4 is a flowchart illustrating an encoding method according to another embodiment of the present invention.

Referring to FIG. 4, in the encoding method according to the current embodiment, a bit amount is assigned in units of a GOP by using predetermined parameters, for example, target$_{sec}$, fps, and I$_{interval}$ in operation S100. The GOP-based bit amount assignment may be performed using Equation 1. After the GOP-based bit amount assignment, a bit amount is assigned in units of a macroblock in operation S110. The macroblock-based bit amount assignment will be described later in more detail with reference to FIG. 5.

Thereafter, in operation S120, a buffer state is checked to determine whether a buffer occupancy rate exceeds a predetermined limit rate. If so, the quantization of operation S130 is skipped and a macroblock is determined to be a non-coded type in operation S160 and then VLC is performed on the macroblock in operation S140. The quantization of operation S130 will be described later in more detail with reference to FIG. 6. After completion of VLC of operation S140, it is determined whether the current macroblock is the last macroblock in operation S150. If so, encoding of a GOP is ended; otherwise, the process proceeds to operation S110 to assign a bit amount in units of a macroblock.

The encoding method according to the current embodiment easily calculates a bit amount in units of a GOP and a bit amount in units of a macroblock by using several parameters such as target$_{sec}$, fps, and I$_{interval}$ and performs or skips quantization by checking a buffer state, thereby accurately predicting a bit amount and allowing stable encoding.

Figure 5:
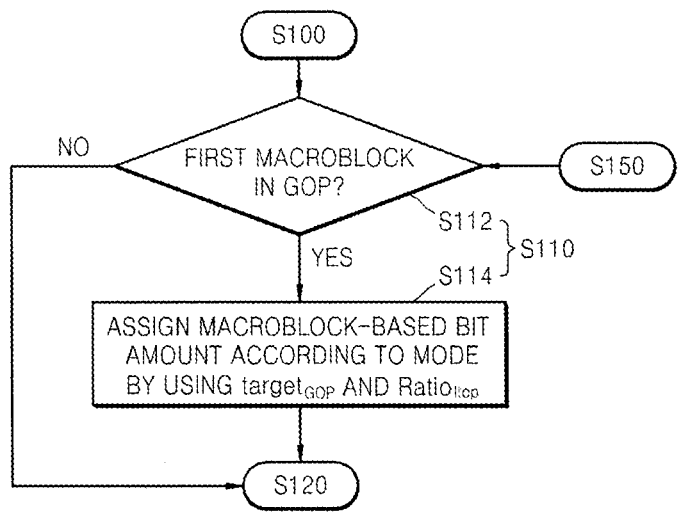
FIG. 5 is a flowchart illustrating in detail an operation of assigning a bit amount in units of a macroblock in the encoding method shown in FIG. 4, according to an embodiment of the present invention.

FIG. 5 is a flowchart illustrating in detail operation S110 of assigning a bit amount in units of a macroblock in the encoding method shown in FIG. 4, according to an embodiment of the present invention.

Referring to FIG. 5, it is determined whether a current macroblock is a first macroblock in a GOP in operation S112. If so, a bit amount is assigned in units of a macroblock according to a mode, that is, an intra mode or an inter mode, by using parameters such as target$_{GOP}$ and Ratio$_{Itop}$ in operation S114. The macroblock-based bit amount assignment may be performed using Equation 2 and Equation 3.

If the current macroblock is not the first macroblock in a GOP, the process proceeds to operation S120 of checking a buffer state. That is, the macroblock-based bit amount assignment is performed on all macroblocks included in a GOP at the start of the GOP. After completion of VLC of operation S140 in FIG. 4, it is determined whether a current macroblock is the last macroblock in operation S150. If not, the process proceeds to operation S112 where the current macroblock is the first macroblock in the GOP, FIG. 6 is a flowchart illustrating in detail operation S130 of performing quantization in the encoding method shown in FIG. 4, according to an embodiment of the present invention.

Figure 6:
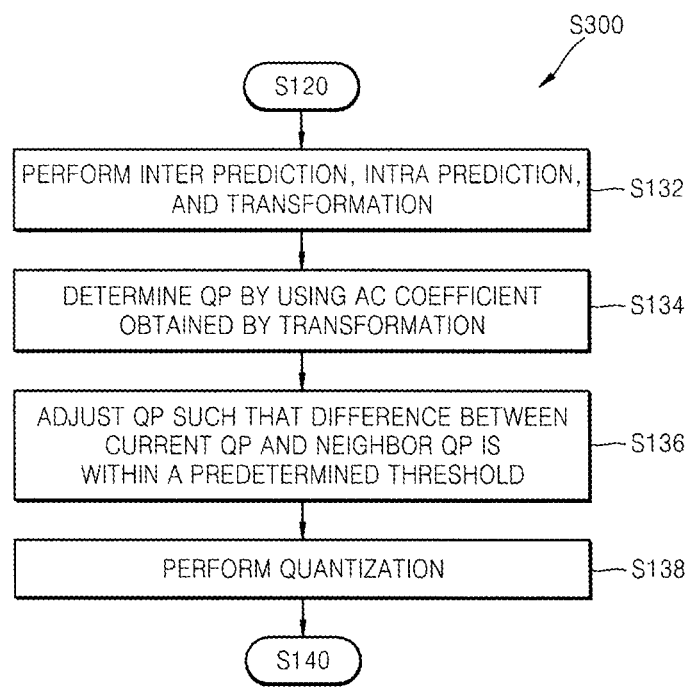
FIG. 6 is a flowchart illustrating in detail an operation of performing quantization in the encoding method shown in FIG. 4, according to an embodiment of the present invention.

Referring to FIG. 6, inter prediction/intra prediction and transformation are performed in operation S132. By using an AC coefficient obtained by the transformation, a QP is determined in operation S134. A current QP is adjusted in such a way that a difference between the current QP and a neighbor QP is within a predetermined threshold in operation S136. Quantization is performed by using the determined QP in operation S138. Such quantization has already been described with reference to FIG. 3, and thus will not be described in detail. Operation S130 of performing quantization may be skipped depending on a buffer occupancy rate as described above.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention relates to a digital multimedia apparatus, and more particularly, to an encoding device and method capable of efficiently performing video encoding in a multimedia apparatus. The encoding device and method and the multimedia apparatus including the encoding device according to the present invention calculate a GOP-based bit amount target$_{GOP}$ in a simple way, that is, by using a target bit rate per second target$_{sec}$, a frame per second fps, and a key frame interval I$_{interval}$, and calculate a macroblock-based bit amount by using a bit amount ratio Ratio$_{Itop}$ of an intra macroblock to an inter macroblock, thereby providing superior bit amount prediction and excellent quality.

The invention claimed is:

1. An encoding device, comprising:
    a group-of-pictures (GOP)-based bit assigning unit configured to assign a GOP-based bit amount target$_{GOP}$;
    a macroblock-based bit assigning unit configured to assign a macroblock-based bit amount for all macroblocks included in the GOP;
    a quantizing device configured to
        check a current buffer state,
        determine a quantization parameter (QP) by using an alternating current (AC) coefficient obtained by transforming a macroblock, and
        perform quantization by using the determined QP when a buffer occupancy rate is lower than a predetermined limit rate; and
    a variable length coding (VLC) unit configured to perform VLC,
    wherein the GOP-based bit assigning unit is configured to divide a target bit rate per second target$_{sec}$ by a frame per second fps, and
        multiply a result of the division by a key frame interval I$_{interval}$, thereby calculating the GOP-based bit amount target$_{GOP}$, and
    wherein the macroblock-based bit assigning unit is configured to determine whether the macroblock is a first macroblock in the GOP when encoding on the GOP starts, and
    when the macroblock is the first macroblock, the macroblock-based bit assigning unit assigns a bit amount to each intra macroblock and each inter macroblock, which are two modes of the macroblock.

2. The encoding device of claim 1, wherein the macroblock-based bit assigning unit is configured to calculate a bit amount target$_{Inter\_MB}$ of the inter macroblock by using the GOP-based bit amount target$_{GOP}$ and a bit amount ratio Ratio$_{Itop}$ of the intra macroblock to the inter macroblock.

3. The encoding device of claim 2, wherein the macroblock-based bit assigning unit is configured to
    calculate the bit amount target$_{inter\_MB}$ of the inter macroblock by dividing the GOP-based bit amount target$_{GOP}$ by a sum of the key frame interval I$_{interval}$ and the bit amount ratio Ratio$_{Itop}$ and
    divide a result of the division by the number of macroblocks MB_Num present in a single frame.

4. The encoding device of claim 2, wherein the bit amount ratio Ratio$_{Itop}$ is first set to an experimentally obtained initial value and then updated by a previously used average bit amount ratio and a current bit amount ratio at every start of encoding of each GOP.

5. The encoding device of claim 1, wherein the quantizing device comprises:
    a predicting and transforming unit configured to perform intra prediction, inter prediction, and transformation on the macroblock;
    a QP determining unit configured to analyze the AC coefficient obtained by the transformation and determine the QP;
    a QP adjusting unit configured to compare a current QP with a neighbor QP and adjust the current QP such that a difference between the current QP and the neighbor QP is within a predetermined threshold; and
    a quantizing unit configured to perform quantizing by using the adjusted QP.

6. The encoding device of claim 1, wherein when the buffer occupancy rate is higher than the predetermined limit rate, the quantizing unit is configured to not perform quantization and the VLC unit is configured to perform the VLC.

7. A multimedia apparatus, comprising:
    an input unit configured to receive a signal to be encoded;
    an encoding device configured to perform encoding by quantizing the signal received at-the input unit according to a group-of-pictures (GOP)-based bit assignment, a macroblock-based bit assignment, and a buffer state;
    a transmitting unit configured to transmit a bitstream encoded by the encoding device;
    a storing unit configured to store the bitstream encoded by the encoding device; and
    a control unit configured to control the input unit, the encoding device, the transmitting unit, and the storing unit,
    wherein the encoding device includes (i) a group-of-pictures (GOP)-based bit assigning unit configured to assign a GOP-based bit amount target$_{GOP}$, and (ii) a macroblock-based bit assigning unit configured to assign a macroblock-based bit amount for all macroblocks included in the GOP;
    wherein the GOP-based bit assigning unit is configured to divide a target bit rate per second target$_{sec}$ by a frame per second fps, and
        multiply a result of the division by a key frame interval I$_{interval}$, thereby calculating the GOP-based bit amount target$_{GOP}$; and
    wherein the macroblock-based bit assigning unit is configured to determine whether the macroblock is a first macroblock in the GOP when encoding on the GOP starts, and
    when the macroblock is the first macroblock, the macroblock-based bit assigning unit assigns a bit amount to each intra macroblock and each inter macroblock, which are two modes of the macroblock.

8. The multimedia apparatus of claim 7, wherein the encoding device further comprises:
    a quantizing device configured to
        check a current buffer state,
        determine a quantization parameter (QP) by using an alternating current (AC) coefficient obtained by transforming a macroblock, and
        perform quantization by using the determined QP when a buffer occupancy rate is lower than a predetermined limit rate; and
    a variable length coding (VLC) unit configured to perform VLC.

9. The multimedia apparatus of claim 8, wherein the macroblock-based bit assigning unit is configured to calculate a bit amount target$_{inter\_MB}$ by dividing the GOP-based bit amount target$_{GOP}$ by a sum of the key frame interval I$_{interval}$ and the bit amount ratio Ratio$_{Itop}$ and dividing a result of the division by the number of macroblocks MB_Num present in a single frame.

10. The multimedia apparatus of claim 8, wherein the quantizing device comprises:
    a predicting and transforming unit configured to perform for performing intra prediction, inter prediction, and transformation on the macroblock;

a QP determining unit configured to analyze the AC coefficient obtained by the transformation and determining the QP;

a QP adjusting unit configured to compare a current QP with a neighbor QP and adjusting the current QP such that a difference between the current QP and the neighbor QP is within a predetermined threshold; and a quantizing unit configured to perform quantizing by using the adjusted QP.

11. An encoding method performed by an encoding device, the encoding method comprising:

assigning a group-of-pictures (GOP)-based bit amount target$_{GOP}$;

assigning a macroblock-based bit amount for all macroblocks included in the GOP according to a mode;

checking a current buffer state;

determining a quantization parameter (QP) by using an alternating current (AC) coefficient obtained by transforming a macroblock;

performing quantization by using the determined QP when a buffer occupancy rate is lower than a predetermined limit rate; and performing variable length coding (VLC), wherein the assigning of the GOP-based bit amount target$_{GOP}$ comprises dividing a target bit rate per second target$_{sec}$ by a frame per second fps, and multiplying a result of the division by a key frame interval I$_{Interval}$, thereby calculating the GOP-based bit amount target$_{GOP}$, and wherein the assigning of the macroblock-based bit amount comprises determining whether the macroblock is a first macroblock in the GOP when encoding on the GOP starts and an assigning operation of assigning a bit amount in units of a macroblock, and when the macroblock is the first macroblock in the determining operation, assigning a bit amount to each intra macroblock and each inter macroblock, which are two modes of the macroblock.

12. The encoding method of claim 11, wherein the assigning of the macroblock-based bit amount comprises calculating a bit amount target$_{inter\_MB}$ by (i) dividing the GOP-based bit amount target GOP by a sum of the key frame interval I$_{Interval}$ and the bit amount ratio Ratio$_{Itop}$ and (ii) dividing a result of the division by the number of macroblocks MB_Num present in a single frame.

13. The encoding method of claim 12, wherein the bit amount ratio Ratio$_{Itop}$ is first set to an experimentally obtained initial value and then updated by a previously used average bit amount ratio and a current bit amount ratio at every start of encoding of each GOP.

14. The encoding method of claim 11, wherein in the determining of whether the macroblock is a first macroblock in the GOP, when the macroblock is not the first macroblock, the checking of the current buffer state is performed.

15. The encoding method of claim 11, wherein the quantization comprises:

performing intra prediction, inter prediction, and transformation on the macroblock;

analyzing the AC coefficient obtained by the transformation and determining the QP;

comparing a current QP with a neighbor QP and adjusting the current QP such that a difference between the current QP and the neighbor QP is within a predetermined threshold; and performing quantizing by using the adjusted QP.

16. The encoding method of claim 15, wherein in the determining of the QP, a bit amount of the macroblock is predicted by using a distribution of the AC coefficient, thereby determining the QP.

17. The encoding method of claim 11, wherein when the buffer occupancy rate is higher than a predetermined limit rate, the VLC is performed while skipping the quantization.

* * * * *